Feb. 20, 1968  G. B. CLARK ET AL  3,369,667

REVERSE OSMOSIS APPARATUS HAVING FEED RECIRCULATION MEANS

Filed March 8, 1966

INVENTORS.
GEORGE B. CLARK
SEROP MANJIKIAN
BY

Agent

United States Patent Office 3,369,667
Patented Feb. 20, 1968

3,369,667
REVERSE OSMOSIS APPARATUS HAVING FEED
RECIRCULATION MEANS
George B. Clark, Poway, and Serop Manjikian, Del Mar,
Calif., assignors to Universal Water Corporation, Del
Mar, Calif., a corporation of California
Filed Mar. 8, 1966, Ser. No. 532,791
8 Claims. (Cl. 210—137)

ABSTRACT OF THE DISCLOSURE

Apparatus for treating a solution by reverse osmosis in which pressurized solution is circulated through a membrane-lined passageway by a pump. The circulating pump is actuated by energy derived from solution flowing through a pressure responsive valve at the output end of such passageway, and before such solution passes through the valve.

---

This invention relates to improvements in apparatus for treating a solution by reverse osmosis.

In a typical reverse osmosis process, a solution containing a dissolved or dispersed solute is passed at high pressure through apparatus which contains a semipermeable membrane. Often the apparatus is provided with an elongated passageway lined with a semi-permeable membrane through which the solution under pressure is passed. The reverse osmosis process results in a portion of the original solution which passes through the semipermeable membrane being purified with respect to the solute originally contained in the solution, while the remainder of the solution becomes correspondingly more concentrated with respect to such solute.

For many years reverse osmosis has been little more than a laboratory curiosity. Recently, however, developments in membrane formation have substantially increased the possible flow through this element and the process is now of interest for commercial adaptation.

Flux, or flow, through the membrane is important in the efficiency of reverse osmosis apparatus. This depends on a number of factors. The porosity and inherent characteristics of the membrane itself are, of course, important, but the concentration of solute in the solution being treated also exerts a large effect. More dilute solutions are more readily treated by reverse osmosis, and as the concentration of the solution becomes greater than membrane efficiency drops. Increase in the solution concentration results in higher solution osmotic pressure which requires higher applied pressure to produce the required driving force for effective separation by reverse osmosis. In the case of solutions containing solutes that precipitate or crystallize at critical concentrations, as for example carbonates and sulfates, the crystalline or solid matter may physically block off or reduce the active surface area.

Another factor affecting membrane performance and efficiency is the formation of a boundary layer at the membrane-solution interface. The local concentration of solute is higher than that in the bulk of the solution being treated, and the solute concentration and thickness of this boundary layer have a major effect on membrane performance.

In the case of apparatus employing a relatively long passageway lined with a semi-permeable membrane, another problem arises. The concentration of solute in the solution increases from input to output end of the passageway. Purified solution being separated as the solution flows along the passage, the continuing residual solution becomes more and more concentrated with respect to the solute. Under these conditions, the over-all efficiency of the membrane is very much reduced; although the membrane may be efficient to accomplish the desired reverse osmosis action at and near its solution input end, where it is in contact with fresh, relatively dilute solution, its efficiency is seriously reduced at and near the output end where the solution is considerably more concentrated. Circulation of large quantities of solution being treated continuously through the membrane lined passageway would be helpful to reduce the concentration gradient, but apparatus to accomplish this is difficult to design because the solution being processed is maintained at very high pressure, often as high as 1500 pounds per square inch or more. Additionally, any external apparatus required for recirculation involves additional complexity in the apparatus, and requires a source of power for operation.

Summarized briefly, this invention provides improvements to accomplish recirculation of the solution being treated by passage through a reverse osmosis module or filtration unit. Recirculation is effected without requiring any external power for operation, and preferably without external apparatus. This is accomplished by providing circulating means such as a pump impeller within a closed loop formed by the membrane lined passageway, or a portion of it, and a conduit, this pump impeller being actuated by energy derived from flow of solution being passed through the module. Ordinarily, solution is introduced into the filtration module at high pressure by a suitable pump, and its flow-through and release is controlled by a pressure responsive valve connected to the output end of the membrane lined passageway. In this invention, solution flowing through and released from the pressure responsive valve actuates the circulating pump by operation of a fluid motor connected to the circulaitng pump impeller. Preferably, the circulating pump and the fluid motor are enclosed within the module and operate with solution under pressure so that no problems of sealing external apparatus or connections arise.

Details of the construction of the apparatus of this invention will be more readily understood by reference to the drawings in which.

Figure 1:
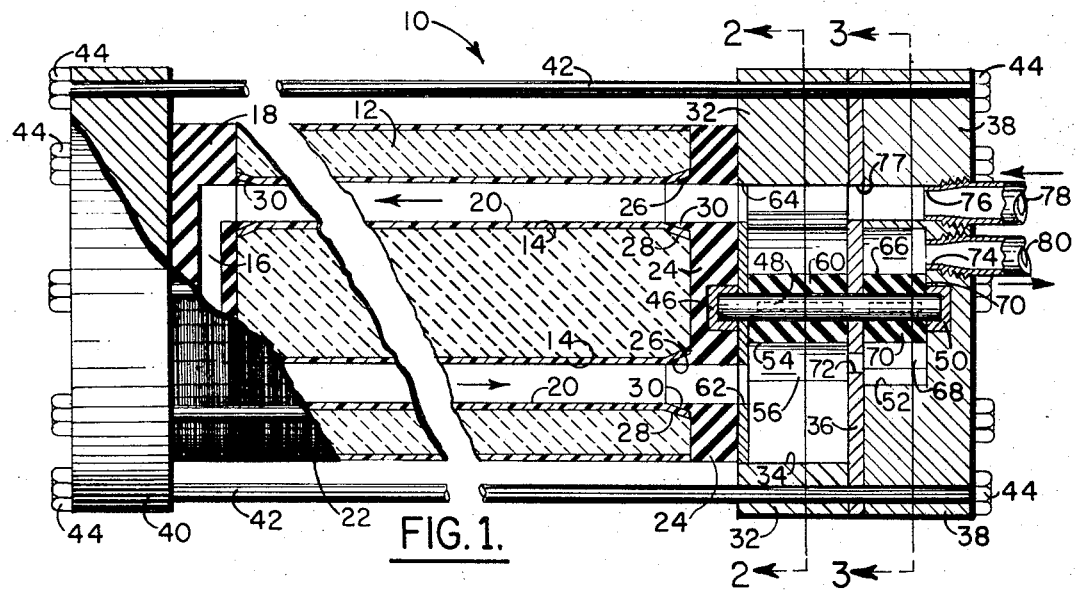
FIG. 1 is a side elevation view of apparatus embodying features of this invention, partly sectioned to show a central vertical section of a major part including one end.

Referring now, particularly to FIG. 1, the filtering unit or module 10 comprises a porous body 12 containing a passageway, formed in the embodiment illustrated by spaced apart bores 14. The left hand ends of bores 14 are connected and communicate with each other through channel 16 in end cap or gasket 18 which is preferably fabricated of resilient material such as rubber. The interior of each of bores 14 is lined with a tubular semipermeable membrane 20. Body 12 is preferably wrapped with glass roving as at 22 which is partly impregnated with synthetic resin to form a resin-lean fiber glass mixture which will add substantial strength to body 12 but will still be porous to permit passage of liquid therethrough.

At the right hand end of body 12 is provided a gasket 24 which has holes 26 to act as extensions of bores 14. Preferably, membrane tubes 20 expand to overlay expanding ends of bores 14 as at 28 and tapered rings 30 extending from gaskets 18 and 24 overlay the membrane tube ends so that these are effectively sealed to prevent leakage of liquid through to the porous body.

Abutting against gasket 24 is pump housing 32 containing a cylindrical pump casing 34. Abutting against the end of pump housing 32 is spacer plate 36, and abutting against spacer plate 36 is right hand end member 38. Abutting against the end of gasket 18 is left hand end member 40 which is tied to right hand end member 38 by rods 42 onto which are threaded nuts 44. Tightening nuts 44 compresses gaskets 18 and 24 to place the whole assembly as described in tight end to end sealed relationship.

One side of pump housing 32 is provided with bearing 46 into which is journalled one end of shaft 48. Spacer plate 36 is provided with an aperture through which shaft 48 passes. The other end of shaft 48 is journalled in bearing 50 which is arranged in end member 38, and which is also disposed in the far side of motor casing 52 which is also contained within end member 38.

Figure 2:
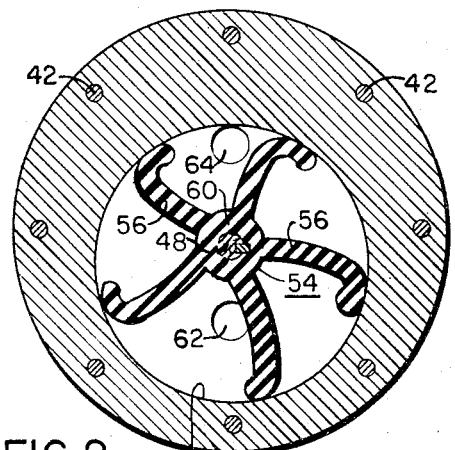
FIG. 2 is a vertical section of the apparatus of FIG. 1 taken along the line 2—2.

Fixedly attached to shaft 48 on its length which traverses pump housing 34 is pump impeller 54 which is fabricated of stiff but resilient material such as rubber and which is formed with a plurality of blades 56 radiating from a central hub 60 which is locked onto shaft 48, as will be seen more clearly in FIG. 2. Blades 56 fit in sealing engagement with the wall and ends of pump casing 34, and it will be noted that shaft 48 is eccentric with respect to casing 34 so that as shaft 48 revolves, liquid will be pumped from its input hole 62 in the end of pump housing 32, compressed by the positive displacement action of blades 56 and pumped out of output hole 64.

Figure 3:
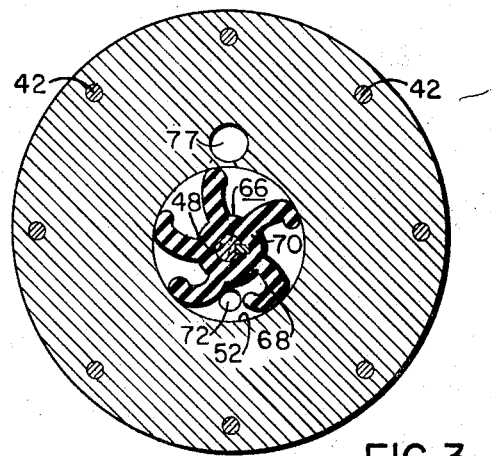
FIG. 3 is a vertical section of the apparatus of this invention taken along the line 3—3.

Fixedly attached to shaft 48 on its length which traverses motor casing 52 is another positive displacement impeller 66 of general design similar to that in pump casing 34 and formed of resilient blades 68 radiating from hub 70, as seen more clearly in FIG. 3. In casing 52, hub 70 and shaft 48 are also eccentric so that liquid entering through input hole 72 in spacer plate 36 rotates impeller 66 before being released through exhaust port 74 passing through end member 38. Intake port 76 also passes through end member 38 communicating with pump casing 34 at its upper end through spacer plate hole 77. Liquid supply pipe 78 is threaded into port 76 and outlet pipe 80 is threaded into exhaust port 74 as shown.

Figure 4:
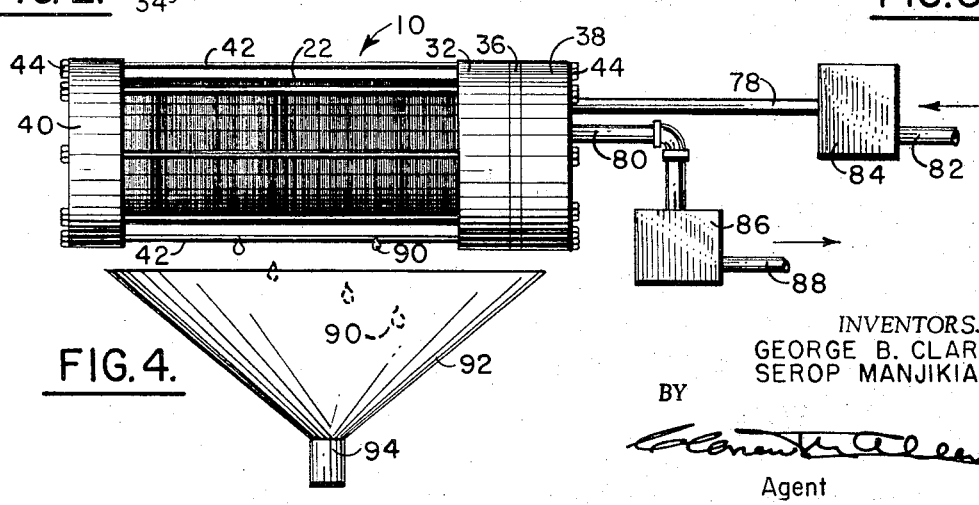
FIG. 4 shows a general schematic illustration of a reverse osmosis filtering system employing the apparatus of FIG. 1.

Operation of the apparatus of this invention will be more readily apparent from reference to FIG. 4. A supply of solution (not shown) to be purified, for example, brackish water, is connected as by pipe 82 to the input of pump 84 whose output is connected by pipe 78 to intake port 76 of filtering module 10. The solution, under hyperatmospheric pressure, that is many times atmospheric and which, for example, may be of the order of from one to several hundred pounds per square inch, passes through pump casing 34, out hole 64 in pump housing 32 and into passageway 14 lined with semi-permeable membranes 20. It then flows back into pump casing 34 through hole 62 in pump housing 32. A part of the solution flows through spacer plate hole 72 into hydraulic motor casing 52. It flows through motor casing 52, and while so doing rotates impeller 66 and shaft 48 and then passes out through exhaust port 74 in end member 38, through outlet pipe 80 and through pressure responsive valve 86, which maintains the desired pressure of solution in module 10 and releases a flow of solution through drain 88. This portion of the solution will be more concentrated with respect to solute contained in the brackish water.

Rotation of impeller 66 by the flow of solution as described above also rotates shaft 48 and pump impeller 54. In the embodiment illustrated, pump casing 34 forms a conduit connecting the input and output ends of the passageway through module body 12. Therefore, rotation of impeller 54 in casing 34 circulates solution around the loop composed of the membrane lined passageway and pump casing 34. Thus, solution being treated in the reverse osmosis module 10 is continually being recirculated. This results in substantially enhanced efficiency of semi-permeable membranes 20 and a higher ratio of purified solution to waste or more concentrated solution.

Solution is passed through module 10 under high pressure as hereinbefore described, but on release through pressure responsive valve 86 drops thereupon to atmospheric pressure. As a result of the pressure control by valve 86 and the high pressure drop in solution released therethrough, the flow of solution through module 10 is extremely forceful even though its rate or volume may be low or high depending on operating conditions and pressure settings. The forceful flow provides energy for positive and correspondingly forceful rotation of liquid motor impeller 66. Since this is direct-connected to pump impeller 54 by shaft 48, the same forceful action is transmitted to the circulating pump. Since the circulating pump acts only to circulate solution around a closed loop, the energy requirements for its actuation are not great. Therefore, pump impeller 54 and its casing 34 may be larger than motor impeller 66 and its casing 52 since it follows that a relatively small volume of solution providing strong, forceful rotation to the liquid motor can result in ability to circulate a substantially larger volume of solution around the membrane loop.

Due to reverse osmosis, purified water passes through membranes 20 and porous body 12, and also its porous reinforcement 22. The purified water is collected as drops of transudate in collector funnel 92, and a purified water product produced in delivery pipe 94.

This invention provides circulation means that can be incorporated into the filtering module and operated under the solution pressure. Thus, all problems of sealing shafts and operating pumps externally are completely avoided. Furthermore, employment of the energy of the solution flow-through to drive the circulating pump is extremely advantageous. First, it provides an operation power source completely within the module; and, second, it uses energy in the solution flow-through that would otherwise be wasted. We are aware that it has previously been proposed to employ the energy in the flow-through solution to assist in the original input pumping. However, practical means for recovering energy in such fashion have not yet, to our knowledge, been disclosed. Quite distinct therefrom, our invention successfully and practically recovers energy from the exhaust solution, not to aid the input pumping but to power an internal solution recirculating pump.

Recirculation of the solution will provide more uniform concentration of the solute over the entire membrane area. It will provide additional turbulent flow to the solution to break up and disperse the boundary layer of concentrated solute. It will remove and maintain in suspension or motion loose particulate matter and keep the active membrane surface clean. It can also reduce the amount of solution which need be treated to produce a desired product since the efficiency and flux through the membrane is substantially improved. Thus, a much more efficient apparatus is provided which can be employed to produce an improved reverse osmosis separation.

We claim:

1. In apparatus for treating a solution by reverse osmosis, which apparatus includes a porous body containing a passageway lined with a semi-permeable membrane and into the input end of which passageway a solution to be treated is introduced under hyperatmospheric pressure and from the output end of which passageway a portion of said solution is released through a pressure responsive valve, the improvements which comprise:

(a) a conduit connecting the output end of said passageway with said passageway at a point remote from said output end thereof, said conduit and said passageway between said output end and said point thereby forming an endless loop;

(b) a pump adapted to circulate a portion of the solution introduced into said passageway through said endless loop; and, (c) means for actuating said pump, said pump and actuating means so constructed that said pump is operated by energy in solution flowing from said output end through said pressure responsive valve before its release through said valve.

2. Apparatus according to calim 1 in which said conduit in (a) connects the output end of said passageway with the input end thereof.

3. Apparatus according to claim 2 in which the casing of said pump in (b) comprises the conduit connecting the input and output ends of said passageway in (a).

4. Apparatus according to claim 1 in which said pump in (b) is a rotary pump having an impeller to circulate said portion of said solution through said endless loop.

5. Apparatus according to claim 4 in which said pump and said fluid motor are of the positive displacement type.

6. Apparatus according to claim 1 in which said pump in (b) is a rotary pump having an impeller to circulate said portion of said solution through said endless loop, and its actuating means in (c) comprise a fluid motor driving said pump impeller operated by flow therethrough of said portion of said solution released through said pressure responsive valve.

7. Apparatus according to claim 6 in which the displacement capacity of the said pump is greater than the displacement capacity of said fluid motor.

8. Apparatus according to claim 6 in which said pump in (b) and said fluid motor in (c) are housed within one end of said apparatus and are connected by a common shaft.

References Cited

UNITED STATES PATENTS 3,133,132  5/1964  Loeb et al. _____ 264—49

FOREIGN PATENTS 295,120  4/1965  Netherlands.

REUBEN FRIEDMAN, *Primary Examiner.*

F. SPEAR, *Assistant Examiner.*